3,341,336
METHOD OF STABILIZING THE STRUCTURE OF EASILY FRAGMENTED FOOD
Louis Jokay, Evanston, Ill., assignor to the United States of America as represented by the Secretary of the Army
No Drawing. Filed Mar. 4, 1965, Ser. No. 437,322
5 Claims. (Cl. 99—199)

ABSTRACT OF THE DISCLOSURE

Method of stabilizing the structure of easily fragmented food items comprising coating or impregnating these items with a solution of gelatin having a bloom strength of from about 250 to about 300 and dehydrating said coated product to a moisture level below 3%.

---

The invention described herein, if patented, may be manufactured and used by or for the Government for governmental purposes without the payment to me of any royalty thereon.

This invention relates to the structure stabilization of fragile or easily fragmented foods and, more particularly, to the stabilization of the structure of dehydrated foods and compressed foods by means of an edible nutritious coating.

With the advent of the space age and successful ventures by man into space, food technology faces a new challenge in providing a space traveler with an adequate supply of food to sustain life. Food supplies which are to be carried in space must of necessity be lightweight and nutritious and, in addition, it is desirable that such supplies be storage-stable, ready-to-eat, and resemble familiar food items. These requirements are more nearly satisfied by dehydrated foods than by food processed or stabilized in any other manner. Space feeding in a zero gravity environment presents certain unusual problems in that any particles of food or droplets of liquid released in the space vehicle during weightlessness will remain suspended in space and constitute a potential hazard to the health of the occupants and to the sensitive equipment within the space craft. With dehydrated foods the problem of crumbling or fragmentation is most acute because of the dry, brittle nature of the product and, to a lesser extent, the same problem exists for compressed foods.

Accordingly, it is among the objects of my invention to stabilize the structure and physical form of fragile or easily fragmented foods.

It is also an object to stabilize the structure of dehydrated and compressed foods without affecting the acceptability of the final product.

A further object is to stabilize the structure of dehydrated and compressed foods by means of an edible, nutritious, dehydrated coating.

Another object is to provide a non-sticky coating which will accomplish the foregoing objects and which will protect food having high hygroscopic properties.

An additional object is to provide a coating which will also bind fatty materials structurally in the food item.

These and other objects and advantages of my invention will become apparent from the detailed description given hereinafter. The detailed description and specific examples while indicating preferred embodiments of the invention are given by way of illustration only, since various changes and modifications within the spirit and scope of the invention will become apparent to those skilled in the art from the detailed description.

Now, in accordance with this invention, I have discovered that the structure of various food items which are fragile and have a tendency to crumble, or disintegrate, may be stabilized or strengthened by means of an edible, nutritious gelatin coating. This coating also stabilizes the internal structure of fat-containing foods to prevent the fat from striking-through or "oiling-off" and, in addition, protects foods which are hygroscopic in nature from becoming sticky. The edible coating material used in my invention consists of a food grade gelatin having a bloom strength of from about 250 to about 300 and preferably about 275. A solution of the gelatin is prepared by dissolving gelatin powder in hot water in a ratio of 1 part by weight of the gelatin to from about 30 to about 10 parts by weight of water. The food item is coated or soaked in the gelatin solution and then chilled to congeal the coating. Thereafter the coating is dehydrated until the moisture content is less than 3%. The resulting coating is hard, lacquer-like and non-sticky and stabilizes the structure and contents of the food item, protects the food and increases the nutritive content or value of the item.

As has already been noted, dehydration of food materials to moisture levels below 3% characteristically produces a product that is hard and brittle and prone to crumble and disintegrate. Lyophilization, i.e., drying of frozen material under high vacuum, is the preferred dehydration technique since it most nearly preserves the original structure, original flavor and nutritive value of the processed food item; but this preservation of the original sometimes delicate structure, accentuates the fragility of the end item. Certain prepared foods, e.g., sandwiches, toast, cakes, etc., have not been considered to be suitable for dehydration since the resulting structure is so fragile that the product can be easily reduced to a powder. In addition to dehydrated foods, other items such as food blocks or cubes compressed from powdery or granular food materials and having a low moisture content are also prone to crumble or shatter and can be advantageously stabilized in structure in accordance with my invention.

The stabilization of the structure of representative members of the foregoing food items will be described in detail in the following examples.

EXAMPLE I

A compressed cereal bar prepared in accordance with Military Specification MIL-C-3483B, entitled "Cereal, Premixed, Compressed," and consisting principally of corn flakes and puffed rice (class 8 of the specification) is stabilized to prevent crumbling or shattering by coating with a solution of food grade gelatin. The coating solution is prepared by dissolving 1 oz. of 275 bloom gelatin in 16 oz. of hot (150° F.) water. The hot liquid gelatin is applied in a single coat to the exposed surfaces of the food bar and the excess material allowed to run off. The coating should completely cover all surfaces, cracks and cavities of the food bar. After the coating operation the product is chilled to congeal the coating. The product is then frozen to a temperature of at least −10° F. Dehydration is accomplished by maintaining an absolute pressure of about 2500 microns and employing direct contact heating of 110° F. Drying process continues until the moisture content of the product is less than 3% and the coating has become lacquer-like in appearance. The dried gelatin coating not only prevents crumbling and shattering of the compressed bar but also protects the bar from the adverse effects of high humidity. Compressed cereal bars frequently contain dried fruit materials as flavoring agents which are extremely hygroscopic and cause the bars to become sticky in the presence of moisture, a problem which does not occur when the bars are coated with gelatin.

EXAMPLE II

A peanut butter sandwich is prepared using white bread, a straight dough bread made with hard wheat flour and without any bread softener. A first bread slice, ¼ inch thick, is covered with a ¼ inch thick layer of commercially available fortified peanut butter and covered with a second slice of bread (¼ inch). A gelatin coating solution is prepared by dissolving 1.5 parts by weight of food grade gelatin (275 bloom) in 32 oz. of hot water. Entire sandwich is immersed in the liquid gelatin until top and bottom slices are thoroughly soaked. The sandwich is removed from the solution and chilled until gelatin congeals. Sandwich is then frozen to −10° F. and dehydrated under an absolute pressure of about 1500 microns or less. During dehydration, radiant heat of 125° F. is applied to the sandwich. Sandwich is then packaged in the absence of oxygen. Alternatively, bite size peanut butter sandwich pieces are prepared by cutting the sandwich after the gelatin has congealed to the desired size and freeze-drying the individual pieces and packaging as above.

EXAMPLE III

A beef sandwich filling is prepared by blending together 16 oz. of finely ground cooked beef with 8.6 oz. of commercial beef gravy, 2 oz. of hot vegetable shortening (100 hours), 9.3 gm. of monosodium glutamate dissolved in 40 cc. of water, and 5.5 oz. of liquid gelatin (1.5 parts by wt. of food grade gelatin, 275 bloom, in 32 oz. of beef broth). A ¼ inch layer of warm beef mixture is placed on a ¼ inch slice of of rye bread and covered with a second slice of the same bread. The entire sandwich is then soaked in a liquid gelatin solution prepared as in Example II, making sure that the liquid gelatin penetrates the bread and reaches the sandwich filling, and then chilled to congeal the coating. The chilled sandwich is cut into bite size pieces and freeze-dried in the manner disclosed in Example II. The vacuum is broken with nitrogen and the dehydrated pieces placed in a can and sealed with a low oxygen headspace. The dehydrated pieces are quite stable and will keep for several weeks. The bite size portions are convenient for space feeding and are readily rehydrated in the mouth. The gelatin coating increases the nutritive value without greatly increasing the weight of the portion and stabilizes the structure of each portion so that crumbling or fragmentation does not occur in the container or in handling.

EXAMPLE IV

The structure stabilization process of the foregoing example is applied to plain toast. The toast is prepared from ⅜ inch slices of white bread, e.g., a straight dough bread made from hard wheat flour without shortening. After toasting one side, the toasted slice is brushed with a warm spread and then chilled until the spread has congealed. The spread consists of a mixture of 1.5 parts of food grade 275 bloom gelatin and 16 parts by weight of water, which is combined with an equal amount of melted vegetable shortening and a butter flavoring agent and a small amount of salt (5 grams). Both sides of the spread coated toast are then coated with a gelatin dip made of 1.5 parts by weight of food grade 250 bloom gelatin and 16 parts by weight of water. The coated toast is chilled to congeal the coating and then blast frozen to a temperature of −10° F. Freeze-dehydration is accomplished by maintaining an absolute pressure of about 1500 microns with a plate temperature of 100° F. After moisture content is reduced to below 2½% the dehydrator vacuum is broken with nitrogen and the dried toast packed in cans in a nitrogen atmosphere or in an evacuated, flexible, sealed polyester film (Mylar) package. Where bite size portions are desired the toast is cut to appropriate size prior to application of spread and the individual portions are then treated in the manner described for the whole slice of toast.

It is noted that gelatin powders of varying bloom strengths may be blended in appropriate proportions so that the final bloom strength will fall within the desired range. Vitamin and minerals as well as flavoring agents may be added to the gelatin coating where this would be desired.

It is apparent that the structure stabilization technique of my invention can be applied to all food items where crumbling or disintegration is a problem. The coating, per se, is odorless and tasteless and increases the nutritive and caloric value of the coated item. In addition, since the coating is quite thin and dehydrated it adds very little weight to the product so coated. Food items stabilized with a gelatin coating, as described herein, can be stored, transported, and consumed in a dry state without danger of shattering, crumbling, or excessive powderiness. In the case of dehydrated foods, rehydration can occur even with the coating present.

I claim:
1. Method of stabilizing the structure of a fragile food item to prevent crumbling or shattering of said item, which method comprises soaking said item in a food grade gelatin solution, said gelatin having a bloom strength of from about 250 to about 300, and then freeze-drying said item to a moisture level of less than 3%.

2. Method of stabilizing the structure of a food item which is to be dehydrated which comprises impregnating the item with a food grade gelatin solution, said gelatin having a bloom strength of from about 250 to about 300, freezing the gelatin coated item, and dehydrating the frozen item to a moisture content not exceeding 3%.

3. A method according to claim 2 wherein said gelatin solution consists of one part by weight of gelatin to from about 10 to about 30 parts by weight of water.

4. A method of stabilizing a compressed food product to prevent crumbling or shattering of said product which comprises applying a food grade gelatin solution to the exterior surfaces of said product, said gelatin having a bloom strength of from about 250 to about 300, and freeze-drying said gelatin coated product to a moisture level of less than 3%.

5. A method according to claim 4 wherein said gelatin solution consists of about 10 to about 30 parts by weight of water having dissolved therein one part by weight of gelatin.

References Cited

UNITED STATES PATENTS

| | | | |
|---|---|---|---|
| 3,013,341 | 12/1961 | Neumann | 99—199 X |
| 3,150,985 | 9/1964 | Buscemi et al. | 99—209 |
| 3,241,982 | 3/1966 | Shank | 99—208 |

A. LOUIS MONACELL, *Primary Examiner.*

L. M. SHAPIRO, *Assistant Examiner.*